Oct. 31, 1933. C. A. RIGHTER 1,933,280
PROTECTOR FOR EVERGREENS, HEDGES, AND OTHER PLANTS
Filed Dec. 31, 1931   2 Sheets-Sheet 2
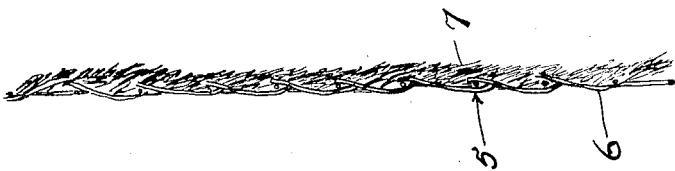
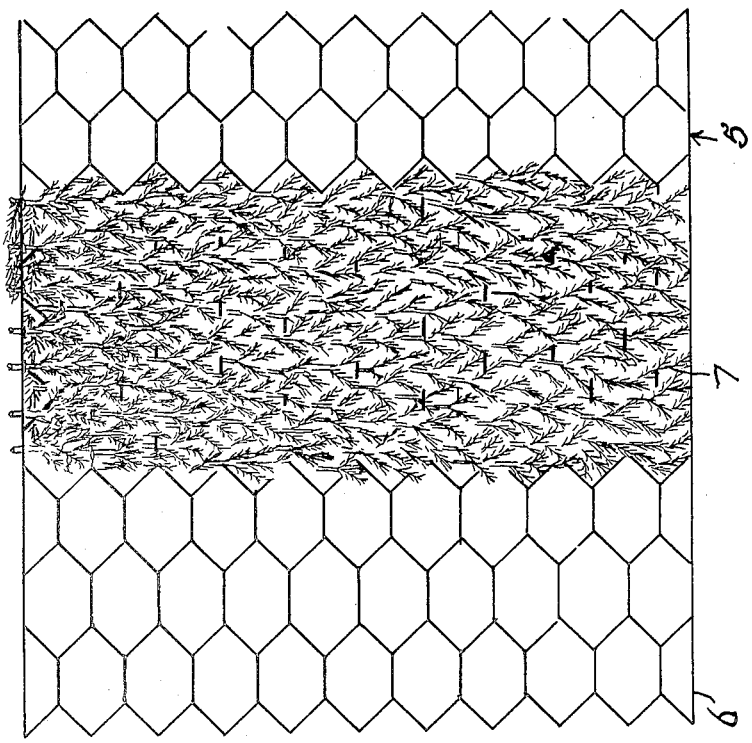
Inventor
Charles Arthur Righter
By W. W. Williamson
Atty Patented Oct. 31, 1933

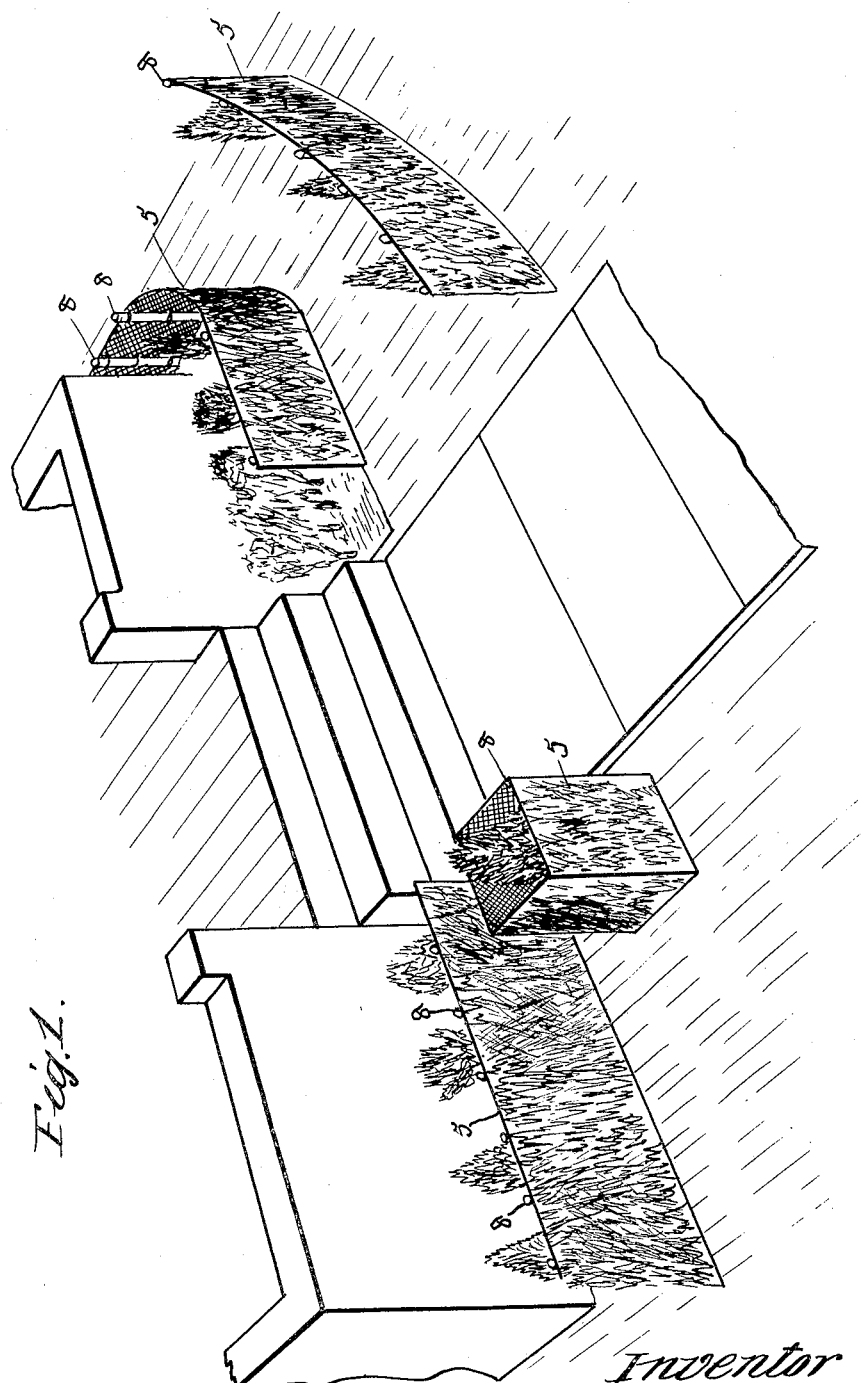

1,933,280

UNITED STATES PATENT OFFICE 1,933,280

PROTECTOR FOR EVERGREENS, HEDGES, AND OTHER PLANTS

Charles Arthur Righter, Philadelphia, Pa.

Application December 31, 1931
Serial No. 584,114

3 Claims. (Cl. 47—26)

My invention relates to new and useful improvements in a protector for evergreens, hedges and other plants and has for one of its objects to provide a protector which will have the general appearance of a hedge, bush or plant in order to have an ornamental effect as well as the protective properties thereof.

Another object of the invention is the production of a protector of this kind from an open work support, such as poultry wire and a screening of evergreen sprays, such as evergreen hemlock sprays.

Another object of the invention is to so arrange the sprays on the open work support that moisture from dew, rain or snow will readily shed therefrom. To accomplish this object of the invention the sprays are mounted on the support with the dark green or posterior side outward and the butt ends of the stems uppermost leaving the tips of the sprays pointing downward.

Another object of the invention is to provide, as a new article of manufacture, a plant protector consisting of a support or base of poultry wire having sprays of an evergreen tree or plant woven into the meshes of the poultry wire.

A further object of the invention is to provide a plant protector fabric consisting of large mesh poultry wire having evergreen sprays woven transversely thereof, and if desirable, their sprays may be woven lengthwise along one or both edges of the poultry wire, especially along the edge which is to be used as the top of the protector so that the stem butts will be partially or entirely concealed. This arrangement from even a short distance will cause the protector to appear as an evergreen hedge or bush since the twigs of the sprays will project in different directions and overlap one another so that the particular direction in which the stems of the sprays extend will not be noticeable to the casual observer. The fabric thus produced may be made in various sized panels and various lengths of runner and of course any of them may be cut into smaller lengths as desired by the user.

A still further object of the invention is to provide a plant protector which while protecting the plant from strong winds and the rays of the sun, yet the protector is sufficiently porous to permit of a free circulation of air for ventilation purposes.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a view, in perspective, of a portion of a building and the surrounding grounds or lawn showing several ways in which the protector may be utilized to safeguard plants from the ravages of the elements during the winter months and give an appearance of hedges and bushes to passersby.

Fig. 2 is an enlarged fragmentary face view of a section of the protector showing some screening made from sprays of an evergreen plant or tree on a short piece of poultry wire.

Fig. 3 is an edge or end view of Fig. 2.

In carrying out my invention as herein embodied, 5 represents the protector comprising the open work support or base 6 consisting of some suitably strong and durable though flexible material, preferably poultry wire. For this purpose I prefer to use eighteen gage galvanized diamond mesh poultry wire.

On one face of the support 6 is mounted the screening 7 consisting of sprays of any suitable evergreen tree or plant such as evergreen, hemlock, English ivy, bayberry, red cedar, pine, fir, holly and the like. The sprays are mounted on the support by weaving them through the meshes of the poultry wire with the dark green or posterior sides outermost and with the butt ends of the stems pointing upward when considered with the protector in use. The sprays are to assume vertical positions when the protector is in use and the twigs, leaves or other parts of adjacent sprays will intermingle or intertwine with each other and form an almost impenetrable barrier to a driving rain or snow and strong winds, particularly because the stronger the wind the more closely the twigs and leaves will be held together against the support, and therefore, the action is somewhat like shutters which are closed by the wind blowing against the same. Even in view of the above there is always a sufficient number of openings which permit a free circulation of air for ventilation purposes.

By placing the butt ends of the stems uppermost when the protector is in use, the leaves and twigs will be in a general downward or pendent condition so that moisture will run rather freely from the screen and will not lay in the crotches and tend to rot the sprays.

If found desirable, a line of sprays may be woven into the support and the sprays which form the main body of the screen along one or both edges of the support and more particularly along that edge where the butt ends of the stems appear so as to partially or fully cover and hide said butt ends.

The protector may be made up as a runner of any desirable length to be cut into shorter lengths as desired by the purchaser or it may be made up into panels of predetermined lengths, for instance anywhere from one to six feet to be used, supposedly, by the purchaser without cutting the same, although it will be obvious that should a person purchase a six foot panel and then find out that two or more shorter ones could be used to better advantage, such a panel could and likely would be cut up by the purchaser.

The protector can be used in front of gardens adjacent buildings, fences, and the like, or in front of a row of exposed bushes, or other plants, or it can be positioned so as to surround a row of or a single plant or bush, all of which will be obvious by reference to Fig. 1 wherein some of the arrangements and methods of utilizing the protector are illustrated.

In order to place and hold the protector in position, I prefer to use cedar posts 8 which are creosoted throughout their entire lengths and suitably embedded in the ground to leave exposed ends of a height approximately equal to the height of the particular protector employed when considered in connection with the protector when in actual use. In other words, wherever I refer to height with respect to the protector, it is to be considered as though the protector is in use because in fact this height is the width of the poultry wire which is used as the support or base.

With the posts or other suitable uprights in place, the protector fabric is then placed against the same and wired or otherwise suitably secured thereto. I find that it is advantageous to wire the protector to the posts since the wire used for this purpose may be readily untwisted or cut to permit removal of the protector whenever desired and particularly at that season of the year when the weather has warmed up sufficiently to make it unnecessary to further protect the plants or bushes from the elements.

Of course I do not wish to be limited to the exact details of construction herein shown and described as these may be varied within the limits of the appended claims without departing from the spirit of my invention.

Having thus fully described my invention, what I claim as new and useful:—

1. A plant protector consisting of a section of poultry wire with sprays of an evergreen plant interwoven in said poultry wire with the butt ends of said sprays uppermost when the protector is in use and said sprays having their dark green or posterior sides exposed to the outside.

2. The structure set forth in claim 1, in combination with additional sprays interwoven through the poultry wire and between the other sprays along one edge of the poultry wire which becomes the upper edge when in use.

3. A porous plant protector to give the appearance of a hedge or bush when in use, consisting of a section of poultry wire positioned with a selvage edge uppermost when in use and evergreen sprays interwoven in said poultry wire with the butt ends of said sprays extending upward so that the tips of said sprays point downward and act to shed moisture accumulating thereon and thereby preventing said moisture from standing in the crotches of any of the elements of said sprays.

CHARLES ARTHUR RIGHTER.